United States Patent [19]

Kosaka et al.

[11] 3,896,067

[45] *July 22, 1975

[54] PROCESS FOR PREPARING POLYMER COMPOSITIONS HAVING SUBSTANTIAL ADHESIVE PROPERTIES

[75] Inventors: Yujiro Kosaka; Masaru Uemura; Tokio Fujiki; Masatoshi Kimura; Mitsutaka Saito, all of Shin Nanyo, Japan

[73] Assignee: Toyo Soda Manufacturing Co., Ltd., Yamaguchi, Japan

[ * ] Notice: The portion of the term of this patent subsequent to July 31, 1990, has been disclaimed.

[22] Filed: Oct. 2, 1973

[21] Appl. No.: 402,919

[30] Foreign Application Priority Data
Oct. 7, 1972   Japan.............................. 47-100304

[52] U.S. Cl.. 260/28.5 AV; 117/122 R; 260/878 R; 260/885
[51] Int. Cl............................................ C08c 11/70
[58] Field of Search........ 260/28.5 AV, 885, 878 R

[56] References Cited
UNITED STATES PATENTS

| | | | |
|---|---|---|---|
| 3,215,657 | 11/1965 | Beresniewicz............... | 260/28.5 AV |
| 3,215,678 | 11/1965 | Adelman..................... | 260/28.5 AV |
| 3,440,194 | 4/1969 | Taranto et al. ............. | 260/28.5 AV |
| 3,523,930 | 8/1970 | Maloney ............................ | 260/885 |
| 3,577,365 | 5/1971 | Folzenlogen et al........ | 260/28.5 AV |

*Primary Examiner*—Melvyn I. Marquis
*Attorney, Agent, or Firm*—Oblon, Fisher, Spivak, McCelland & Maier

[57] ABSTRACT

A polymer composition having substantial adhesiveness is prepared by copolymerizing an alkylacrylate and maleic anhydride in the presence of an ethylene-vinylacetate copolymer and a hydrocarbon base selected from the group consisting of a hydrocarbon wax, a low molecular weight non-aromatic hydrocarbon resin, a chlorinated hydrocarbon wax and a chlorinated low molecular weight non-aromatic hydrocarbon resin having a molecular weight of 200–20,000.

10 Claims, No Drawings

PROCESS FOR PREPARING POLYMER COMPOSITIONS HAVING SUBSTANTIAL ADHESIVE PROPERTIES

BACKGROUND OF THE INVENTION

1. Field of the Invention:

The present invention relates to a process for preparing a polymer composition with substantial adhesive properties.

2. Description of the Prior Art:

It is well-known that excellent adhesive properties can be imparted to ethylene polymers by incorporating polar groups in the polymers. It is also known that ethylene polymers are thermoplastic polymers which have excellent melt fluidity, and they are frequently the main components of hot melt type adhesives which are different from the conventional solution or emulsion adhesives. However, a need continues to exist for compositions which impart substantial adhesive properties to ethylene polymers.

SUMMARY OF THE INVENTION

Accordingly, one object of the invention is to provide a process for preparing a polymer composition which has substantial adhesive properties.

Another object of the invention is to provide a process for preparing an ethylene polymer composition which has very good adhesive properties which in turn can be used as a principle component of a hot melt adhesive.

Briefly, these objects and other objects of the invention as hereinafter will become more readily apparent can be attained by providing a process for preparing a polymer composition having substantial adhesive properties which comprises copolymerizing an alkyl acrylate and maleic anhydride, and if desired, an $\alpha,\beta$-ethylenically unsaturated carboxylic acid in the presence of an ethylene-vinylacetate copolymer and a hydrocarbon base (hereinafter referred to as a chlorinated hydrocarbon or a polyolefin) selected from the group of hydrocarbon waxes, low molecular weight non-aromatic hydrocarbon resins, chlorinated hydrocarbon waxes and chlorinated low molecular weight non-aromatic hydrocarbon resins, which have a molecular weight of 200 – 20,000.

DETAILED DESCRIPTION OF THE PREFERRED EMBODIMENTS

The polymer composition prepared by the process of the invention can be used as a principle component of a hot melt adhesive, and also as a component of a pressure sensitive adhesive or a solution type adhesive. It has excellent adhesive properties with regard to metals such as copper, aluminum, iron, and the like. Specifically, the polymer composition of the invention comprises (1) an ethylene-vinylacetate copolymer, (2) a chlorinated hydrocarbon or a polyolefin, (3) an alkyl acrylate and (4) maleic anhydride and if desired, an $\alpha,\beta$-ethylenically unsaturated carboxylic acid. The components are dissolved, swelled or dispersed in a solvent or the monomer mixture itself, and then the polymer composition is prepared by copolymerizing the components by initiation with a radical polymerization initiator. The ratio of the monomer components can be chosen depending upon the use of the polymer composition. It is preferable to copolymerize 5 – 80 parts by wt. of a mixture of the alkylacrylate and maleic anhydride and if desired the $\alpha\beta$-ethylenically unsaturated carboxylic acid in the presence of 95 – 20 parts by wt. of a mixture of the ethylene-vinylacetate copolymer and the chlorinated hydrocarbon or polyolefin. The ratio of the polyolefin or the chlorinated hydrocarbon to ethylene-vinylacetate can vary and is preferably in the range of 1:0.1 – 10.

The content of the vinylacetate component of the ethylene-vinylacetate copolymer which is used to optimize the objectives of the invention is in the range of 5 – 70 wt.%, especially 10 – 40 wt.%. The ethylene-vinylacetate copolymer can be prepared by a conventional radical polymerization procedure such as a high pressure polymerization method at 1000 – 3000 atm. or a solution or emulsion polymerization method at 100 – 400 atm. The molecular weight of the ethylene-vinylacetate copolymer can vary, and the melt index of the ethylene-vinylacetate copolymer is preferably in the range of 0.1 – 500 g/10 min.

The polyolefinic hydrocarbon component used in the process of the invention preferably has a molecular wight of 200 – 20,000 and includes polyolefins having a molecular weight less than 20,000 such as paraffin wax, micro crystalline wax, polyethylene wax, atactic polypropylene, polyisobutene, and petroleum resins synthesized from $C_4$ or $C_5$ fractions or hydrogenated petroleum resins. Chlorinated hydrocarbons can also be used instead of polyolefins to accomplish the objectives of the invention. Preferably chlorinated hydrocarbons are used which have unstable or active hydrogen atoms such as those on tertiary carbon atoms or allylic hydrogen atoms from the viewpoint of their effectiveness in graft polymerization reactions. Suitable chlorinated hydrocarbons include chlorinated paraffin wax, chlorinated polypropylene, chlorinated polybutene, and the like. Hydrocarbon resins having a molecular weight greater than 20,000 have low miscibility with the ethylene-vinylacetate copolymer which is used as the base polymer, so that these hydrocarbon resins are not suitable for use.

The alkylacrylates which are used in the process of the invention include alkyl esters of acrylic acid or methacrylic acid. The alkyl group can be a straight chain or branched chain of from 1 – 20 carbon atoms. Suitable alkylacrylates include methacrylate, n-butylacrylate, lauryl acrylate, stearyl acrylate, isobutyl acrylate, t-butyl acrylate, 2-ethylhexyl acrylate, methyl methacrylate, butyl methacrylate, 2-ethylhexyl methacrylate, and the like.

Suitable $\alpha,\beta$-ethylenically unsaturated carboxylic acids include acrylic acid, methacrylic acid, maleic acid, fumaric acid, itaconic acid, the methyl or ethyl acid ester of fumaric acid or maleic acid, and the like. Acrylic acid and methacrylic acid are especially preferred. In the preparation of the adhesive copolymer composition the amount of maleic anhydride combined with another $\alpha,\beta$-ethylenically unsaturated carboxylic acid or anhydride ranges from 100 – 3 : 0 – 97.

The polymerization initiators which are used in the process of the invention can be the conventional radical polymerization initiators which include dialkyl peroxides such as dicumyl peroxide and di-t-butyl peroxide; peroxy esters such as t-butyl peroxy benzoate, t-butyl peroxy octoate, t-butyl peroxy acetate, t-butyl peroxy isobutylate and t-butyl peroxy pivalate; acyl peroxides such as lauroyl peroxide, benzoyl peroxide and acetyl peroxide; peroxy carbonates such as diisopropyl peroxy-dicarbonates and azo compounds such as azobisisobutyronitrile. Preferably, the organic peroxides such as peroxy esters are used. In the polymerization reaction usually from about 0.1 – 10 wt.% of the radical polymerization initiator is used based on the amount of monomer mixture of alkyl acrylate and maleic anhydride. If desired, another $\alpha,\beta$-ethylenically unsaturated carboxylic acid can also be used. The copolymerization reaction is preferably conducted at a temperature from room temperature to 150°C. The polymerization can be performed by a solution polymerization, a suspension polymerization, an emulsion polymerization or a bulk polymerization procedure. If a solution polymerization procedure is used, aromatic hydrocarbons such as benzene, toluene and xylene; aliphatic hydrocarbons such as kerosine, hexane and petroleum ether; and chlorinated hydrocarbons such as 1,2-dichloroethane can be used as the solvent.

The polymer composition prepared by the process of the invention is a polymer composition comprising (1) a grafted copolymer wherein the alkyl acrylate and maleic anhydride and, if desired, another $\alpha,\beta$-ethylenically unsaturated carboxylic acid are grafted to the ethylene-vinylacetate copolymer and the chlorinated hydrocarbon or polyolefin component, and (2) a copolymer formed by copolymerizing the monomers.

The polymer compositions exist in semi-solid to solid states at room temperature, and have those properties which are characteristic of carboxyl group containing polymers, depending upon the type and amount of the components. The polymer composition is a thermoplastic polymer composition which can be used as a hot melt adhesive and a pressure sensitive adhesive. Its adhesive and tackiness characteristics can be enhanced by admixing the copolymer with a tackifier such as rosin, hydrogenated rosin, derivatives thereof, a terpene resin, a phenol resin or a cumaron-indene resin; a plasticizer such as asphalt, coal-tar or liquid dioctylphthalate; tall oil, castor oil and wax. The polymer composition prepared by the procedure of the invention can be dissolved in various solvents, and can be used as an adhesive agent when dissolved in a solvent such as toluene, methylethylketone, ethyl acetate, or the like.

The polymer composition of the invention has excellent adhesiveness to metal surfaces such as iron, copper, aluminum and also to plastic surfaces such as polyethylene, polypropylene and polystyrene.

Having generally described the invention, a further understanding can be obtained by reference to certain examples which are provided for purpose of illustration only and are not intended to be limiting unless otherwise specified. In the following examples, the terms "part" and "percent" are by weight unless otherwise specified.

EXAMPLE 1

A graft copolymerization reaction was conducted with the following components in a 3 liter autoclave.

| | |
|---|---|
| Ethylene-vinylacetate copolymer (vinylacetate content 28% melt index 400 g/10 min.) | 200 g |
| Atactic polypropylene (M.W. 8,000) | 100 g |
| Maleic anhydride | 30 g |
| 2-Ethylhexylacrylate | 200 g |

-Continued

| | |
|---|---|
| Ethylacrylate | 100 g |
| t-Butyl peroxy octoate | 2 ml |
| Benzene | 1,000 g |

Ethylene-vinylacetate copolymer and atactic polypropylene were charged into the autoclave which was purged with nitrogen gas. To the purged autoclave was added maleic anhydride, 2-ethylhexylacrylate, ethylacrylate and benzene. After stirring the components for 1 hour at 90°C, a polymerization initiator was added and the mixture was copolymerized at 90°C for 6 hours. After the copolymerization reaction, the solvent and the monomers were recovered by steam distillation. The resulting polymer composition was washed with water and dried whereby 586 g of the polymer composition were obtained.

70 Parts of the polymer composition were added to 30 parts of a hydrogenated rosin glycerine ester and the mixture was melted and mixed and was coated at 150°C on a kraft paper substrate to a thickness of 50$\mu$ to prepare an adhesive tape. The viscosity of the molten composition was 100,000 cps. The properties of the adhesive tape are shown in Table I.

TABLE 1

| | Substrate | Adhesive agent Example 1 | Rubber type Adhesive Agent |
|---|---|---|---|
| Adhesive strength JISZ-1523 | Aluminum | 2.3 kg/25mm | 0.8 kg/25 mm |
| | Lauan | 1.5 kg/25mm | 0.7 kg/25 mm |
| | Water repellent Corrugated board | 2.0 kg/25mm | 0.7 kg/25mm |
| | Polyethylene | 2.0 kg/25mm | 0.2 kg/25mm |
| | Glass | 2.8 kg/25mm | 0.4 kg/25mm |

It is clear that the adhesive tape of Example 1 is superior than the rubber type adhesive tape. The adhesive strength of the polymer composition of Example 1 on an aluminum plate was 3.9 kg/25mm.

EXAMPLE 2

The graft copolymerization reaction of Example 1 was followed except that the chlorinated paraffin (40% chlorine content) was used instead of atactic polypropylene. The yield of the polymer composition was 600 g. The resulting polymer composition and a hydrogenated rosin glycerine ester were melted and mixed to prepared the adhesive composition in accordance with the procedure of Example 1. The pressure sensitive adhesive properties of the adhesive composition are shown in Table II.

TABLE II

| Adhesive Strength | | Substrate | |
|---|---|---|---|
| | | Aluminum | 1.5 kg/25 mm |
| | | Lauan | 1.2 kg/25 mm |
| | | Water repellent Corrugated board | 1.3 kg/25 mm |
| | | Polyethylene | 1.1 kg/25 mm |
| | | Glass | 1.7 kg/25 mm |
| Viscosity | 150°C | 47,000 cps. | |

The adhesive strength of the polymer composition of Example 2 on an aluminum plate was 2.8 kg/25 mm.

EXAMPLE 3

A graft copolymerization was conducted with the following components in a 2 liter autoclave in accordance with the procedure of Example 1.

| | |
|---|---|
| Ethylene-vinylacetate copolymer (vinylacetate content 28% melt index 400 g/10 min.) | 150 g |
| Atactic polypropylene (M.W. 5,000) | 225 g |
| Maleic anhydride | 23 g |
| 2-Ethylhexyl acrylate | 150 g |
| Ethyl acrylate | 38 g |
| t-Butyl peroxy octoate | 1.5 ml |
| Benzene | 750 g |
| Polymerization temperature | 90°C |
| Polymerization time | 6 hours |
| Yield | 541 g |

The resulting polymer composition and a hydrogenated rosin glycerine ester were melted and mixed to prepare the adhesive composition in accordance with the procedure of Example 1. The pressure sensitive adhesive properties of the adhesive composition are shown in Table III.

TABLE III

| Adhesive Strength | Substrate | |
|---|---|---|
| | Aluminum | 2.5 kk/25 mm |
| | Lauan | 0.5 kg/25 mm |
| | Water repellent Corrugated board | 1.2 kg/25 mm |
| | Polyethylene | 1.8 kg/25 mm |
| | Glass | 3.1 kg/25 mm |
| Viscosity 150°C | 27,500 cps. | |

The adhesive strength of the polymer composition of Example 3 on an aluminum plate was 2.9 kg/25mm.

EXAMPLE 4

A graft copolymerization was condusted with the following components in a 2 liter flask equipped with a stirrer, a thermometer, a reflux condenser and a nitrogen inlet tube.

| | |
|---|---|
| Ethylene-vinylacetate copolymer vinylacetate 28% melt index 400g/10 min. | 150 g |
| Polyisobutylene | 50 g |
| 2-Ethylhexylacrylate | 250 g |
| Ethylacrylate | 50 g |
| t-Butyl peroxy octoate | 2 ml |
| Benzene | 1,000 g |
| Polymerization temperature | 83 °C |
| Polymerization time | 5 hours |
| Polymer yield | 489 g |

The adhesive strength of the resulting polymer composition was 6.7 kg/25 mm.

EXAMPLE 5

A graft copolymerization was conducted with the following composition in accordance with the procedure of Example 4.

| | |
|---|---|
| Ethylene-vinylacetate copolymer vinylacetate 40% | 50 g |

-Continued

| | |
|---|---|
| melt index 65 g/10 min. | |
| Atactic polypropylene (M.W. 12,000) | 150 g |
| 2-Ethylhexylacrylate | 200 g |
| Methyl methacrylate | 50 g |
| Maleic anhydride | 50 g |
| Benzoyl peroxide | 1 g |
| t-Butyl-oxypivalate (70% isoparaffin sol.) | 1 ml |
| Benzene | 1,000 g |
| Polymerization temperature | 75 °C |
| Polymerization time | 10 hours |
| Polymer yield | 436 g |

The resulting polymer composition had pressure sensitive adhesive properties. It was melted at 150°C and coated on kraft paper to a thickness of 50μ to prepare an adhesive tape. The pressure sensitive properties of the adhesive tape are shown in Table IV.

TABLE IV

| Adhesive Strength | Substrate | |
|---|---|---|
| | Aluminum | 2.3 kg/25 mm |
| | Lauan | 1.3 kg/25 mm |
| | Water repellent Corrugated board | 1.0 kg/25 mm |
| | Polyethylene | 1.6 kg/25 mm |
| | Glass | 1.8 kg/25 mm |
| Viscosity 150°C | 25,600 cps. | |

Having now fully described this invention, it will be apparent to one of ordinary skill in the art that many changes and modification can be made thereto without departing from the spirit or scope of the invention as set forth herein.

What is claimed as new and intended to be covered by Letters Patent is:

1. An adhesive polymer composition, which comprises:
   a grafted copolymer wherein a monomer mixture of an alkyl acrylate and maleic anhydride is grafted onto 95 – 20 parts by weight of a mixture of an ethylene-vinyl acetate copolymer containing 5 – 70 wt.% vinyl acetate and a hydrocarbon base, wherein the ratio of said hydrocarbon base to said ethylene-vinyl acetate copolymer is 1 : 0.1 – 10; and
   a copolymer formed by the polymerization of said monomer mixture, wherein the content of said monomer mixture in said polymer composition is 5 – 80 parts by weight.

2. The adhesive polymer composition of claim 1, wherein said hydrocarbon base is a hydrocarbon wax, a low molecular weight non-aromatic hydrocarbon resin, a chlorinated hydrocarbon wax or a chlorinated low molecular weight non-aromatic hydrocarbon resin having a molecular weight of 200 – 20,000.

3. The polymer composition of claim 1, wherein an α,β-ethylenically unsaturated carboxylic acid or anhydride is admixed with said maleic anhydride in a quantity such that the ratio of maleic anhydride to said acid or anhydride is 100~3 : 0~97.

4. The polymer composition of claim 1, wherein said hydrocarbon base is paraffin, polyethylene wax, atactic polypropylene, polyisobutene, petroleum resin or a hydrogenated product thereof.

5. The polymer composition of claim 1, wherein the vinylacetate content of said ethylene-vinylacetate copolymer is 5 – 70% by weight and the melt index of said vinylacetate is 0.1 – 500 g/10min.

6. The polymer composition of claim 1, wherein said alkylacrylate is an alkyl ester of acrylic acid or methacrylic acid containing an alkyl group having 1 – 20 carbon atoms.

7. The polymer composition of claim 3, wherein said α,β-ethylenically unsaturated carboxylic acid or anhydride is an acrylic, methacrylic, maleic, fumaric or itaconic acid, acid ester or anhydride.

8. The polymer composition of claim 1, wherein the ratio of said alkylacrylate to said maleic anhydride is 1 : 0.1 – 10.

9. The polymer composition of claim 3, wherein the ratio of said alkylacrylate to a mixture of said maleic anhydride with said α,β-ethylenically unsaturated carboxylic acid or anhydride is 1 : 0.1 – 10.

10. The polymer composition of claim 1, wherein 5 – 80% by weight of a monomer mixture of said alkyl acrylate and said maleic anhydride or a mixture of said maleic anhydride with said α,β-ethyleneically unsaturated carboxylic acid or anhydride and 95 – 5% by weight of a base mixture of said ethylene-vinylacetate copolymer and said hydrocarbon base are copolymerized.

* * * * *